(12) United States Patent
Balakrishnan et al.

(10) Patent No.: US 7,697,428 B2
(45) Date of Patent: Apr. 13, 2010

(54) ANALYZING NETWORK TRAFFIC USING AN IMPROVED MARKOV MODULATED POISSON PROCESS MODEL WITH TWO BARRIER STATES

(75) Inventors: Ganesh Balakrishnan, Morrisville, NC (US); Jorge R. Rodriguez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 11/514,493

(22) Filed: Sep. 1, 2006

(65) Prior Publication Data

US 2008/0123549 A1    May 29, 2008

(51) Int. Cl.
*G01R 31/08*    (2006.01)
(52) U.S. Cl. ...................................... 370/230
(58) Field of Classification Search .............. 370/230.1, 370/253, 232
See application file for complete search history.

(56) References Cited

U.S. PATENT DOCUMENTS

| | | | | |
|---|---|---|---|---|
| 5,343,465 A | * | 8/1994 | Khalil | 370/232 |
| 6,715,005 B1 | | 3/2004 | Rodriguez et al. | |
| 2004/0208127 A1 | * | 10/2004 | Rodriguez et al. | 370/235.1 |
| 2004/0208131 A1 | | 10/2004 | Rodriguez et al. | |

OTHER PUBLICATIONS

Adibi et al., "Self-Similarity for Data Mining and Predictive Modeling: A Case Study for Network Data," Univ. of Southern California.
Sha Xue-jun et al., A Fast Method for Generating Self-Similar Network Traffic and the Statistical Hiding Algorithm', Dept. Electronics and Communication Engineering, Harbin Institute of Technology, http://www.paper.edu.cn.
Ge et al., "Parameter Estimation for MMPPs using the ME Algorithm," Dept. of Computing, Imperial College London, England.
Reddy, "Internet Traffic Variability (Long Range Dependency Effects)," CS8803, Fall 2003.

(Continued)

*Primary Examiner*—Ayaz R Sheikh
*Assistant Examiner*—Nicholas Sloms
(74) *Attorney, Agent, or Firm*—John R. Biggers; Cynthia G. Seal; Biggers & Ohanian, LLP.

(57) ABSTRACT

Methods, apparatus, and products are disclosed for analyzing network traffic using an improved Markov Modulated Poisson Process Model with two barrier states that include: retrieving a previous state for the network traffic; measuring inter-arrival times between individual packets received in one or more network adapters; establishing a transition window in dependence upon the measured inter-arrival times, the transition window having a transition value $\lambda^B_{max}$ that represents an upper boundary for the inter-arrival times in a bursty state and having a transition value $\lambda^I_{min}$ that represents a lower boundary for the inter-arrival times in an idle state; retrieving a previous fence value that prevents premature transitions into the idle state or the bursty state; and determining a current state for the network traffic in dependence upon the previous state for the network traffic, an inter-arrival time of a most recently received packet, the transition values, and the previous fence value.

15 Claims, 6 Drawing Sheets

OTHER PUBLICATIONS

DaSilva et al., "Traffic Models," ECE 5984, Network Performance, Design, and Management, Bradley Dept. of Electrical and Computer Engineering, Virginia Polytechnic Institute and State Univ., Mar. 9, 2002.

Hyytia, "Characterization of Internet Traffic," S-38.149 Postgraduate Course in Teletraffic Theory, pp. 1-15, Oct. 11, 1999.

Samuel, "The Application of Non-Linear Dynamics to Teletraffic Modelling," Submitted for the Degree of Doctor of Philosophy, Dept. of Electronic Engineering, Queen Mary and Westfield College, Univ. of London, pp. 1-165, Jul. 1999.

* cited by examiner

ANALYZING NETWORK TRAFFIC USING AN IMPROVED MARKOV MODULATED POISSON PROCESS MODEL WITH TWO BARRIER STATES

BACKGROUND OF THE INVENTION

1. Field of the Invention

The field of the invention is data processing, or, more specifically, methods, apparatus, and products for analyzing network traffic using an improved Markov Modulated Poisson Process Model with two barrier states.

2. Description of Related Art

The flow of information in a network is often called 'traffic.' Units of information used in network communication are referred to as 'packets.' Packets generally arrive at a point in the network at random intervals resulting in 'bursts' of traffic, causing congestion, and resulting in 'idle' periods in which traffic is somewhat more sparse.

Systems that use a network for communication can benefit from the analysis and characterization of the network traffic to optimize the critical performance parameters for optimal utilization of the various network resources. Examples of applications for this type of analysis may include the synchronization of a user process with the completion of the receive operation at the system to network interface, load balancing, routing, quality of service management, and adaptive tuning of the system/network performance parameters. One way to perform the analysis of network traffic is to provide a model that recognizes the characteristics of the network traffic. Over the past decade, network traffic as been characterized as both bursty and self-similar in nature. Bursty behavior describes network traffic that arrives in bursts at a point in the network. Self-similarity is the phenomenon in which network traffic behaves the same when viewed at different degrees of magnification, or different scales on a time dimension. Because network traffic has been shown to be bursty and self-similar, a method used to analyze network traffic should be able to represent behavior that is bursty in self-similar traffic.

Different methods are known for analyzing and characterizing network traffic. The Poisson Process is a widely used model to analyze traffic from voice sources. Bursty behavior in self-similar traffic, however, has been shown to be approximated by a Markov Modulated Poisson Process ('MMPP'). An MMPP model consists of two states that describe network traffic—a bursty state and an idle state. The bursty state represents the state of network traffic during a period when packet inter-arrival times are relatively small because the packets are arriving in bursts compared to other periods represented by the idle state in which packet inter-arrival times are relatively large because traffic is somewhat more sparse. The packet inter-arrival time is the time period between the arrival of one packet and the arrival of the next packet and may be measured from the perspective of one or more points on the network.

Current MMPP models work by transitioning between the bursty state and the idle state based on the mean inter-arrival times in each state and the inter-arrival time for the most recently received packet. The mean inter-arrival time for packets received in the bursty state is $\lambda^B_{mean}$. The mean inter-arrival time for packets received in the idle state is $\lambda^I_{mean}$. The transition from the idle state to the bursty state occurs when the inter-arrival time of the most recently received packet drops below $\lambda^B_{mean}$. Similarly, the transition from the bursty state to the idle state occurs when the inter-arrival time of the most recently received packet rises above $\lambda^I_{mean}$.

Although current MMPP models aid in the analysis of network traffic, current MMPP models often fail to detect premature or false transitions between the bursty and idle states. As a result, applications of network traffic analysis using current MMPP models suffer from inaccurate characterizations of network traffic. Those skilled in the art, therefore, appreciate that a need exists for improved models for analyzing network traffic.

SUMMARY OF THE INVENTION

Methods, apparatus, and products are disclosed for analyzing network traffic using an improved Markov Modulated Poisson Process Model with two barrier states that include: retrieving a previous state for the network traffic; measuring inter-arrival times between individual packets received in one or more network adapters; establishing a transition window $[\lambda^B_{max}, \lambda^I_{min}]$ in dependence upon the measured inter-arrival times, the transition window having a transition value $\lambda^B_{max}$ that represents an upper boundary for the inter-arrival times in a bursty state, the transition window having a transition value $\lambda^I_{min}$ that represents a lower boundary for the inter-arrival times in an idle state; retrieving a previous fence value that prevents premature transitions into the idle state or the bursty state; and determining a current state for the network traffic in dependence upon the previous state for the network traffic, an inter-arrival time of a most recently received packet, the transition values, and the previous fence value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
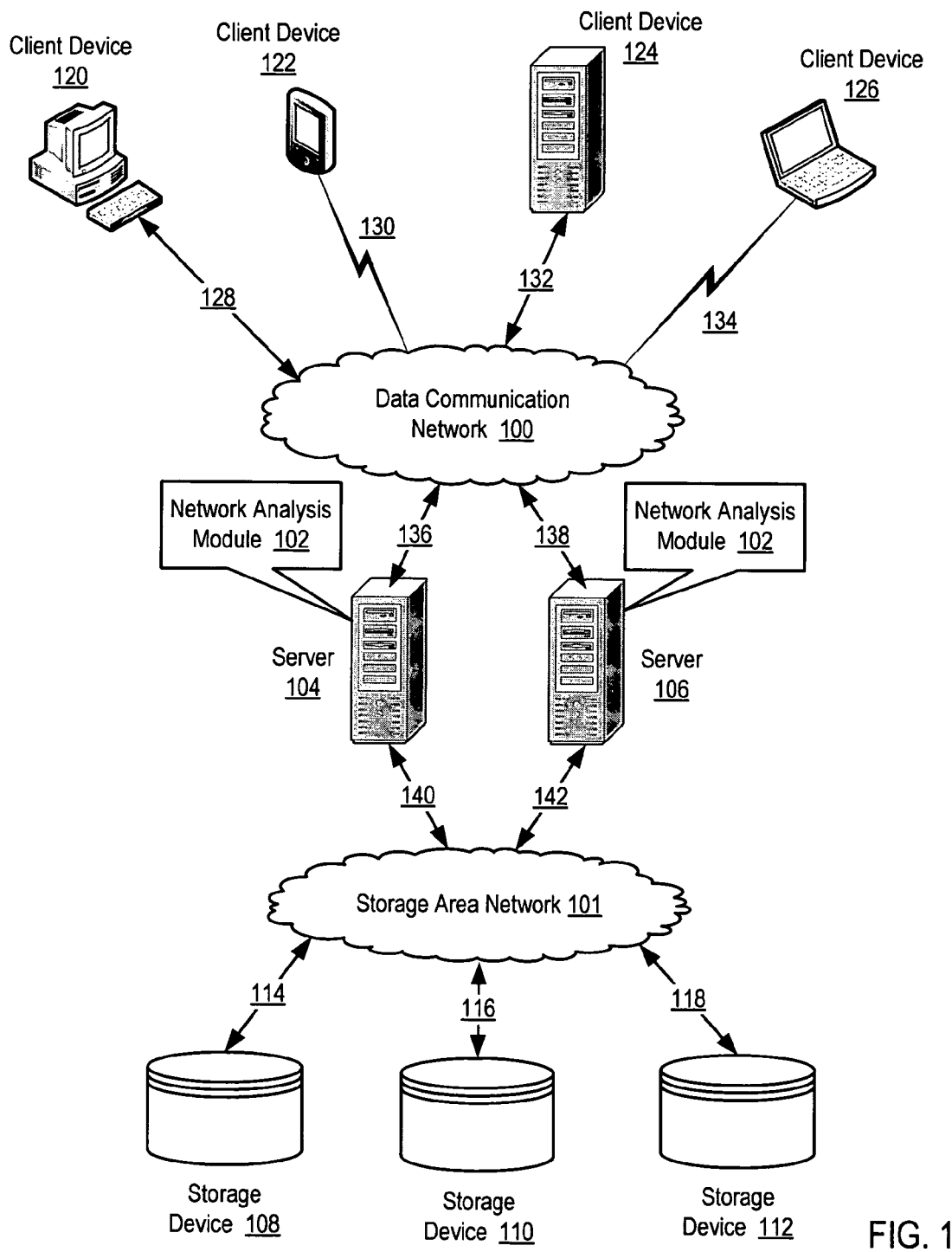
FIG. 1 sets forth a network diagram illustrating an exemplary system for analyzing network traffic using an improved Markov Modulated Poisson Process Model with two barrier states according to embodiments of the present invention.

Exemplary methods, apparatus, and products for analyzing network traffic using an improved Markov Modulated Poisson Process Model with two barrier states according to embodiments of the present invention are described with reference to the accompanying drawings, beginning with FIG. 1. FIG. 1 sets forth a network diagram illustrating an exemplary system for analyzing network traffic using an improved Markov Modulated Poisson Process Model with two barrier states according to embodiments of the present invention.

The exemplary system of FIG. 1 includes two servers (104, 106) connected to data communications network (100) and storage area network ('SAN') (101). The server (104) connects to the data communications network (100) through wireline connection (136) and connects to the SAN (101) through wireline connection (140). The server (106) connects to the data communications network (100) through wireline connection (138) and connects to the SAN (101) through wireline connection (142). Each server (104, 106) is a computer device having installed upon it a network analysis module (102). The network analysis module (102) of FIG. 1 is computer program instructions configured for analyzing network traffic using an improved Markov Modulated Poisson Process Model with two barrier states according to embodiments of the present invention. The network analysis module (102) operates generally for analyzing network traffic using an improved Markov Modulated Poisson Process Model with two barrier states according to embodiments of the present invention by: retrieving a previous state for the network traffic; measuring inter-arrival times between individual packets received in one or more network adapters; establishing a transition window $[\lambda^B_{max}, \lambda^I_{min}]$ in dependence upon the measured inter-arrival times; retrieving a previous fence value that prevents premature transitions into the idle state or the bursty state; and determining a current state for the network traffic in dependence upon the previous state for the network traffic, an inter-arrival time of a most recently received packet, the transition values, and the previous fence value. The transition window has a transition value $\lambda^B_{max}$ that represents an upper boundary for the inter-arrival times in a bursty state and defines a probability $\rho^B$ that a packet with an inter-arrival time lower than $\lambda^B_{max}$ belongs to the bursty state. The transition window has a transition value $\lambda^I_{min}$ that represents a lower boundary for the inter-arrival times in an idle state and defines a probability $\rho^I$ that a packet with an inter-arrival time higher than $\lambda^I_{min}$ belongs to the idle state.

In the example of FIG. 1, the network analysis module (102) that is installed on each server (104, 106) analyzes network traffic of network (100) and SAN (101) using an improved MMPP Model with two barrier states in real-time. The network analysis module (102) typically analyzes the network (100) and the SAN (101) separately. That is, the network analysis module (102) typically determines a current state for the network traffic for each network (100, 101). Although the network traffic of each separate network is typically analyzed by the network analysis module (102) of FIG. 1 separately, readers will note that such separate analysis is not a limitation of the present invention.

The network analysis module (102) of FIG. 1 may also analyze the network traffic for a network based on the packets received in one or more network adapters providing an interface to the network. For example, the network analysis module (102) may analyze network traffic by restricting the analysis to packets received in a single network adapter installed in a single server. The network analysis module (102) of FIG. 1 may also analyze network traffic by analyzing packets received in a multiple network adapters installed in a single server. Still further, the network analysis module (102) of FIG. 1 may analyze network traffic by analyzing packets received in a multiple network adapters installed across more than one server. In fact, there is no limitation to the number of network adapters or the number of devices into which the adapters are installed for analyzing network traffic using an improved Markov Modulated Poisson Process Model with two barrier states according to embodiments of the present invention.

In the exemplary system of FIG. 1, the data communications network (100) is the hardware and software infrastructure for connecting various devices together for data communications. In the example of FIG. 1, client device (120) connects to network (100) through a wireline connection (128). The client device (122) connects to network (100) through a wireless connection (130). The client device (124) connects to network (100) through a wireline connection (132). The client device (126) connects to network (100) through a wireless connection (134).

The SAN (101) of FIG. 1 is the hardware and software infrastructure for connecting various computer devices and storage device together for data communication. The primary purpose of SAN (101) is to transfer data between computer devices and storage devices. SANs are typically implemented using the Ethernet (IEEE 802.3) standard or Fibre Channel standard, but any standard or protocol as will occur to those of skill in the art may be used to implement a SAN. In the example of FIG. 1, storage device (108) connects to SAN (101) through wireline connection (114). The storage device (110) connects to SAN (101) through wireline connection (116). The storage device (112) connects to SAN (101) through wireline connection (118). Storage device may be implemented as shared storage arrays, tape libraries, or any other devices as will occur to those of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Analyzing network traffic using an improved Markov Modulated Poisson Process Model with two barrier states in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary server (104) useful in analyzing network traffic using an improved Markov Modulated Poisson Process Model with two barrier states according to embodiments of the present invention. The server (104) of FIG. 2 includes at least one computer processor (156) or 'CPU' as well as random access memory (168) ('RAM') which is connected through a high speed memory bus (166) and bus adapter (158) to processor (156) and to other components of the server.

Figure 2:
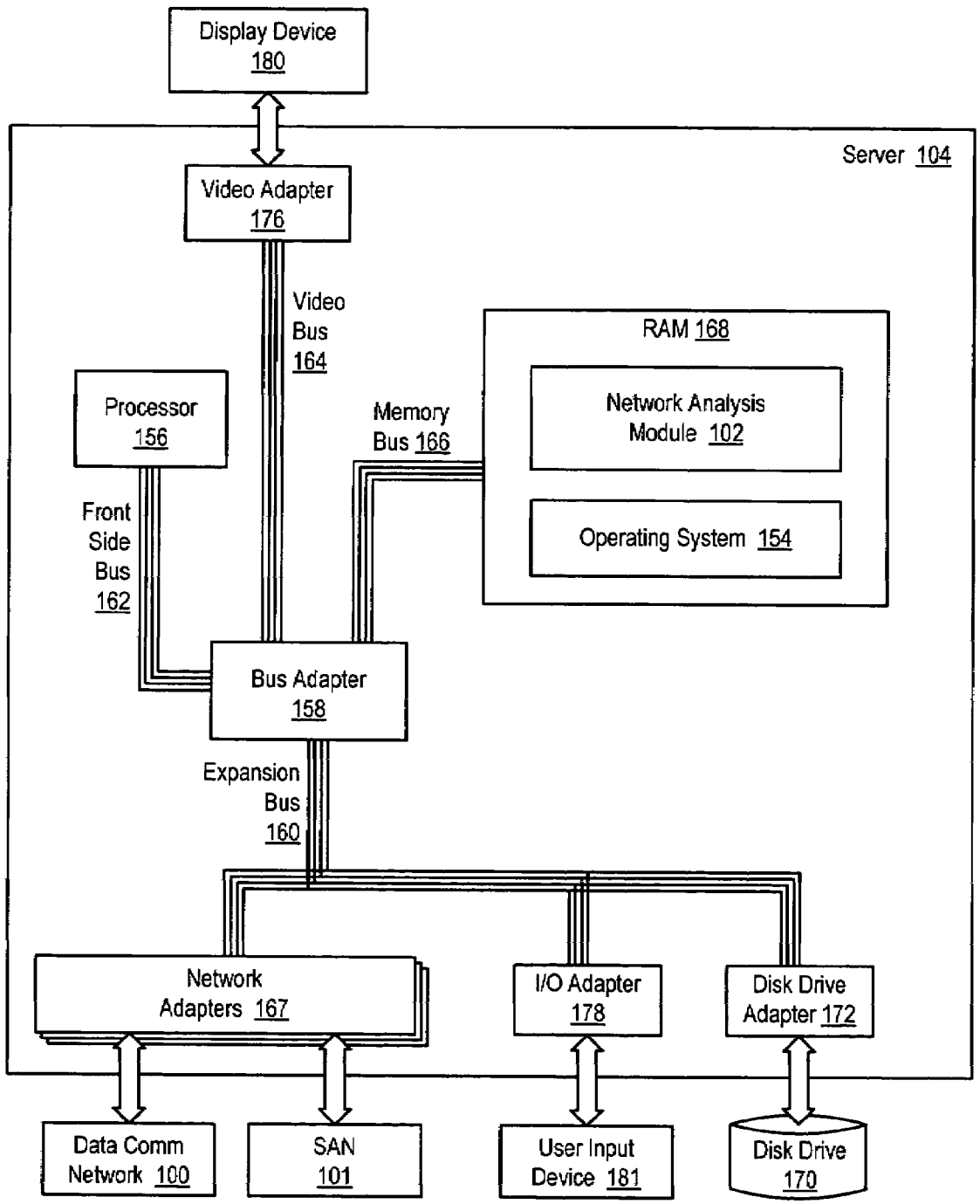
FIG. 2 sets forth a block diagram of automated computing machinery comprising an exemplary server useful in analyzing network traffic using an improved Markov Modulated Poisson Process Model with two barrier states according to embodiments of the present invention.

Stored in RAM (168) are a network analysis module (102) and an operating system (154). The network analysis module (102) illustrated in FIG. 2 is a software component, that is computer program instructions, that operate as described above with reference to FIG. 1 regarding the servers. The network analysis module (102) of FIG. 2 may communicate with the components installed in the server (104), such the network adapters (167), through function calls to the operating system (154), to installed device drivers (not shown), to computer BIOS, or in any other manner as will occur to those of skill in the art. Operating systems useful in servers according to embodiments of the present invention include UNIX™, Linux™, Microsoft NT™, IBM's AIX™, IBM's i5/OS™, and others as will occur to those of skill in the art. The operating system (154) and the network analysis module (102) in the example of FIG. 2 are shown in RAM (168), but many components of such software typically are stored in non-volatile memory also, for example, on a disk drive (170).

The exemplary server (104) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in servers useful according to embodiments of the present invention include the Intel Northbridge, the Intel Memory Controller Hub, the Intel Southbridge, and the Intel I/O Controller Hub. Examples of expansion buses useful in servers useful according to embodiments of the present invention may include Peripheral Component Interconnect ('PCI') buses and PCI Express ('PCIe') buses.

The exemplary server (104) of FIG. 2 also includes disk drive adapter (172) coupled through expansion bus (160) and bus adapter (158) to processor (156) and other components of the exemplary server (104). Disk drive adapter (172) connects non-volatile data storage to the exemplary server (104) in the form of disk drive (170). Disk drive adapters useful in servers include Integrated Drive Electronics ('IDE') adapters, Small Computer System Interface ('SCSI') adapters, and others as will occur to those of skill in the art. In addition, non-volatile computer memory may be implemented for a server as an optical disk drive, electrically erasable programmable read-only memory (so-called 'EEPROM' or 'Flash' memory), RAM drives, and so on, as will occur to those of skill in the art.

The exemplary server (104) of FIG. 2 includes one or more input/output ('I/O') adapters (178). I/O adapters in servers implement user-oriented input/output through, for example, software drivers and computer hardware for controlling output to display devices such as computer display screens, as well as user input from user input devices (181) such as keyboards and mice. The exemplary server (104) of FIG. 2 includes a video adapter (176), which is an example of an I/O adapter specially designed for graphic output to a display device (180) such as a display screen or computer monitor. Video adapter (176) is connected to processor (156) through a high speed video bus (164), bus adapter (158), and the front side bus (162), which is also a high speed bus.

The exemplary server (104) of FIG. 2 also includes network adapters (167) for data communications with a data communications network (200) and for data communications with a storage area network (101). Such data communications may be carried out through data communications networks such as IP data communications networks, through storage area networks such as Fibre Channel networks, and in other ways as will occur to those of skill in the art. Network adapters implement the hardware level of data communications through which one computer device sends data communications to another computer device through a data communications network. Examples of communications adapters useful for analyzing network traffic using an improved Markov Modulated Poisson Process Model with two barrier states according to embodiments of the present invention include IEEE 802.3 Ethernet adapters for wired data communications network communications, IEEE 802.11b adapters for wireless data communications network communications, Fibre Channel network adapters, and so on.

Figure 3:
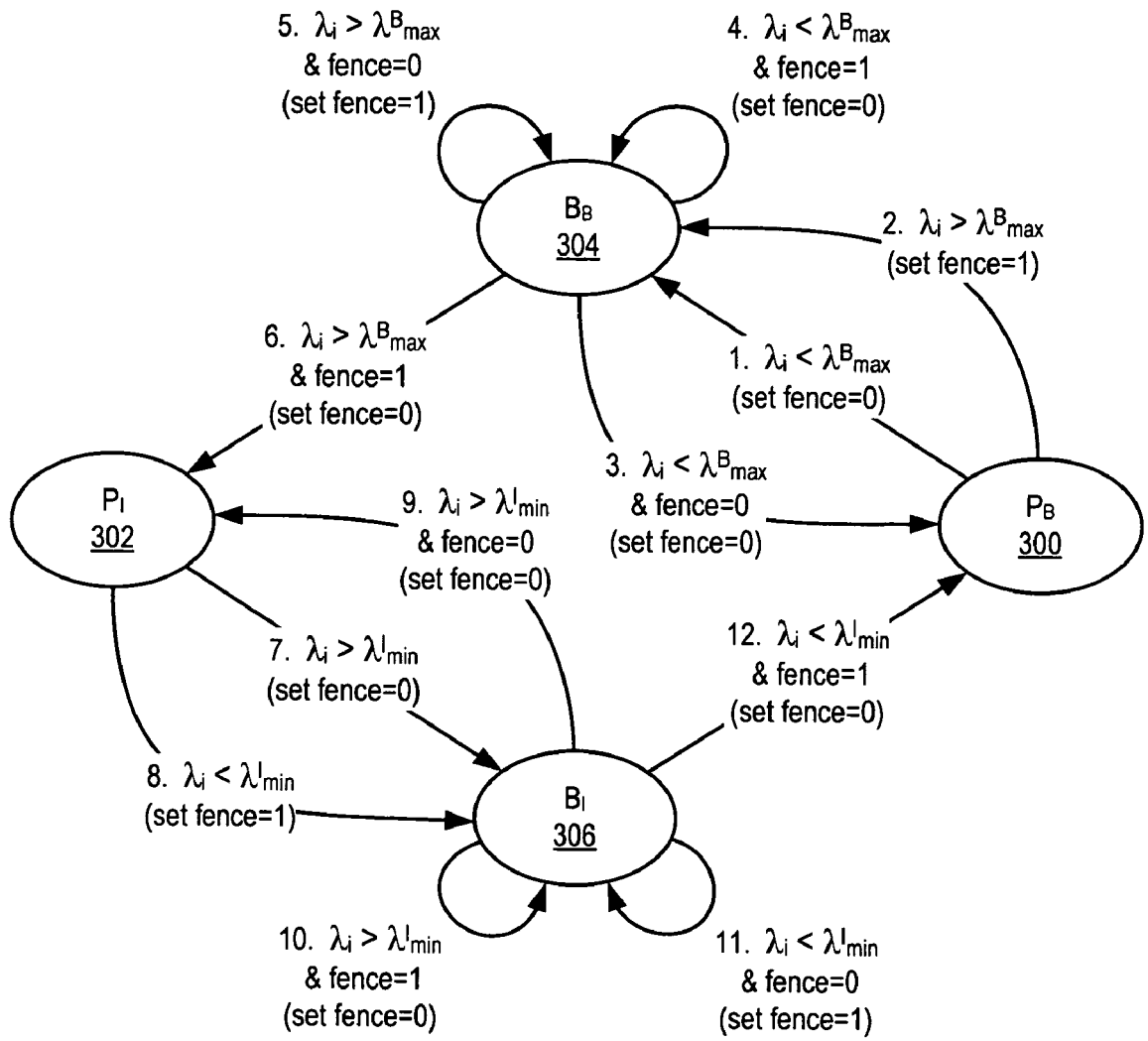
FIG. 3 sets forth an exemplary state diagram illustrating an example of an improved Markov Modulated Poisson Process Model with two barrier states useful according to embodiments of the present invention.

For further explanation, FIG. 3 sets forth an exemplary state diagram illustrating an example of an improved Markov Modulated Poisson Process Model with two barrier states useful according to embodiments of the present invention. The state diagram of FIG. 3 includes a bursty state '$P_B$' (300) and an idle state '$P_I$' (302). The state diagram of FIG. 3 also includes a bursty barrier state '$B_B$' (304) and an idle barrier state '$B_I$' (306). The bursty barrier state (304) represents a potential transition from the bursty state to the idle state, and the idle barrier state (306) represents a potential transition from the idle state to the bursty state. Transitions from a bursty state (300) to an idle state (302) in the exemplary state diagram of FIG. 3 only occur through the bursty barrier state (304). Similarly, transitions from the idle state (302) to the bursty state (300) only occur through the idle barrier state (306).

In the state diagram of FIG. 3, transitions to a current state from a previous state depend on the previous state for the network traffic, an inter-arrival time $\lambda_i$ of a most recently received packet, the transition values $\lambda^B_{max}$ and $\lambda^I_{min}$, and the previous fence value. The $\lambda^B_{max}$ represents an upper boundary for the inter-arrival times in a bursty state (300) and defines a probability $\rho^B$ that a packet with an inter-arrival time lower than $\lambda^B_{max}$ belongs to the bursty state (300). The $\lambda^I_{min}$ represents a lower boundary for the inter-arrival times in an idle state (302) and defines a probability $\rho^I$ that a packet with an inter-arrival time higher than $\lambda^I_{min}$ belongs to the idle state (302). In the state diagram of FIG. 3, the transition value $\lambda^B_{max}$ is substantially smaller than the transition value $\lambda^I_{min}$.

Similar to the current state, the current fence value in the state diagram of FIG. 3 also depends on the previous state for the network traffic, an inter-arrival time $\lambda_i$ of a most recently received packet, the transition values $\lambda^B_{max}$ and $\lambda^I_{min}$, and the previous fence value. The fence value is a value of a counter that prevents premature transitions into the idle state or the bursty state. In the example of FIG. 3, a transition into the idle state (302) from the bursty barrier state (304) cannot occur before the fence value reaches '1.' When the fence value is '0,' the transition from the bursty barrier state (304) is into either the bursty state (300) or the current state remains the bursty barrier state (304). Similarly, a transition into the bursty state (300) from the idle barrier state (306) also cannot occur before the fence value reaches '1.' When the fence value is '0,' the transition from the idle barrier state (306) is into either the idle state (302) or the current state remains the idle barrier state (306).

The transitions between states in the exemplary state diagram of FIG. 3 are fully described using the twelve cases below:

Case 1: When the previous state is the bursty state (300) and $\lambda_i < \lambda^B_{max}$, the current state is set to the bursty barrier state (304) and the current fence value is set to '0.'

Case 2: When the previous state is the bursty state (300) and $\lambda_i \gg \lambda^B_{max}$, the current state is set to the bursty barrier state (304) and the current fence value is set to '1.'

Case 3: When the previous state is the bursty barrier state (304), $\lambda_i < \lambda^B_{max}$, and the previous fence value is '0,' the current state is set to the bursty state (300) and the current fence value is set to '0.'

Case 4: When the previous state is the bursty barrier state (304), $\lambda_i < \lambda^B_{max}$ and the previous fence value is '1,' the current state is set to the bursty barrier state (304) and the current fence value is set to '0.'

Case 5: When the previous state is the bursty barrier state (304), $\lambda_i > \lambda^B_{max}$, and the previous fence value is '0,' the current state is set to the bursty barrier state (304) and the current fence value is set to '1.'

Case 6: When the previous state is the bursty barrier state (304), $\lambda_i > \lambda^B_{max}$, and the previous fence value is '1,' the current state is set to the idle state (302) and the current fence value is set to '0.'

Case 7: When the previous state is the idle state (302) and $\lambda_i > \lambda^I_{min}$, the current state is set to the idle barrier state (306) and the current fence value is set to '0.'

Case 8: When the previous state is the idle state (302) and $\lambda_i < \lambda^I_{min}$, the current state is set to the idle barrier state (306) and the current fence value is set to '1.'

Case 9: When the previous state is the idle barrier state (306), $\lambda_i > \lambda^I_{min}$, and the previous fence value is '0,' the current state is set to the idle state (302) and the current fence value is set to '0.'

Case 10: When the previous state is the idle barrier state (306), $\lambda_i > \lambda^I_{min}$, and the previous fence value is '1,' the current state is set to the idle barrier state (306) and the current fence value is set to '0.'

Case 11: When the previous state is the idle barrier state (306), $\lambda_i > \lambda^I_{min}$, and the previous fence value is '0,' the current state is set to the idle barrier state (306) and the current fence value is set to '1.'

Case 12: When the previous state is the idle barrier state (306), $\lambda_i > \lambda^I_{min}$, and the previous fence value is '1,' the current state is set to the bursty state (300) and the current fence value is set to '0.'

As mentioned above, the exemplary state diagram of FIG. 3 illustrates an example of an improved Markov Modulated Poisson Process Model with two barrier states according to embodiments of the present invention. For further explanation, FIG. 4 sets forth exemplary timing diagrams of network traffic for analysis using the exemplary improved Markov Modulated Poisson Process Model with two barrier states illustrated in FIG. 3. Each timing diagram depicts the arrival of packets $P_i \ldots P_n$ using vertical arrows. Incoming packets $P_{n+1}$ and $P_{n+2}$ are depicted in the timing diagrams as $X_1$ and $X_2$ respectively. The location of $X_1$ and $X_2$ in the timing diagram relative to transition window (400) represents the value of the inter-arrival times of $X_1$ and $X_2$.

Each timing diagram of Figure illustrates a transition window (400) [$\lambda^B_{max}, \lambda^I_{min}$] as a shaded rectangle. As mentioned above, the $\lambda^B_{max}$ represents an upper boundary for the inter-arrival times in a bursty state and defines the probability $\rho^B$ that a packet with an inter-arrival time lower than $\lambda^B_{max}$ belongs to the bursty state. The min represents a lower boundary for the inter-arrival times in an idle state and defines the probability $\rho^I$ that a packet with an inter-arrival time higher than $\lambda^I_{min}$ belongs to the idle state. In the timing diagrams of FIG. 4, the transition value $\lambda^B_{max}$ is substantially smaller than the transition value $\lambda^I_{min}$.

The timing diagrams for cases 1-3 depict the arrival of packets with inter-arrival times that result in a transition from the bursty state to the idle state through the bursty barrier state. Because the initial state in each case 1-3 is the bursty state, each packet $P_i \ldots P_n$ includes a superscripted 'B.' In case 1 of FIG. 4, the inter-arrival time of packet $X_1$ is greater than $\lambda^B_{max}$ and less than $\lambda^I_{min}$. After the arrival of packet $X_1$, the current state is set to the bursty barrier state and the current fence value is set to '1.' The inter-arrival time of packet $X_2$ is also greater than $\lambda^B_{max}$ and less than $\lambda^I_{min}$. After the arrival of packet $X_2$, the current state is set to the idle state and the current fence value is set to '0' because the probability of a premature transition occurring from the bursty state to the idle state is extremely low when the inter-arrival times of two consecutive packets are greater than $\lambda^B_{max}$. Such a probability is determined by the value for $\lambda^B_{max}$.

Figure 4:
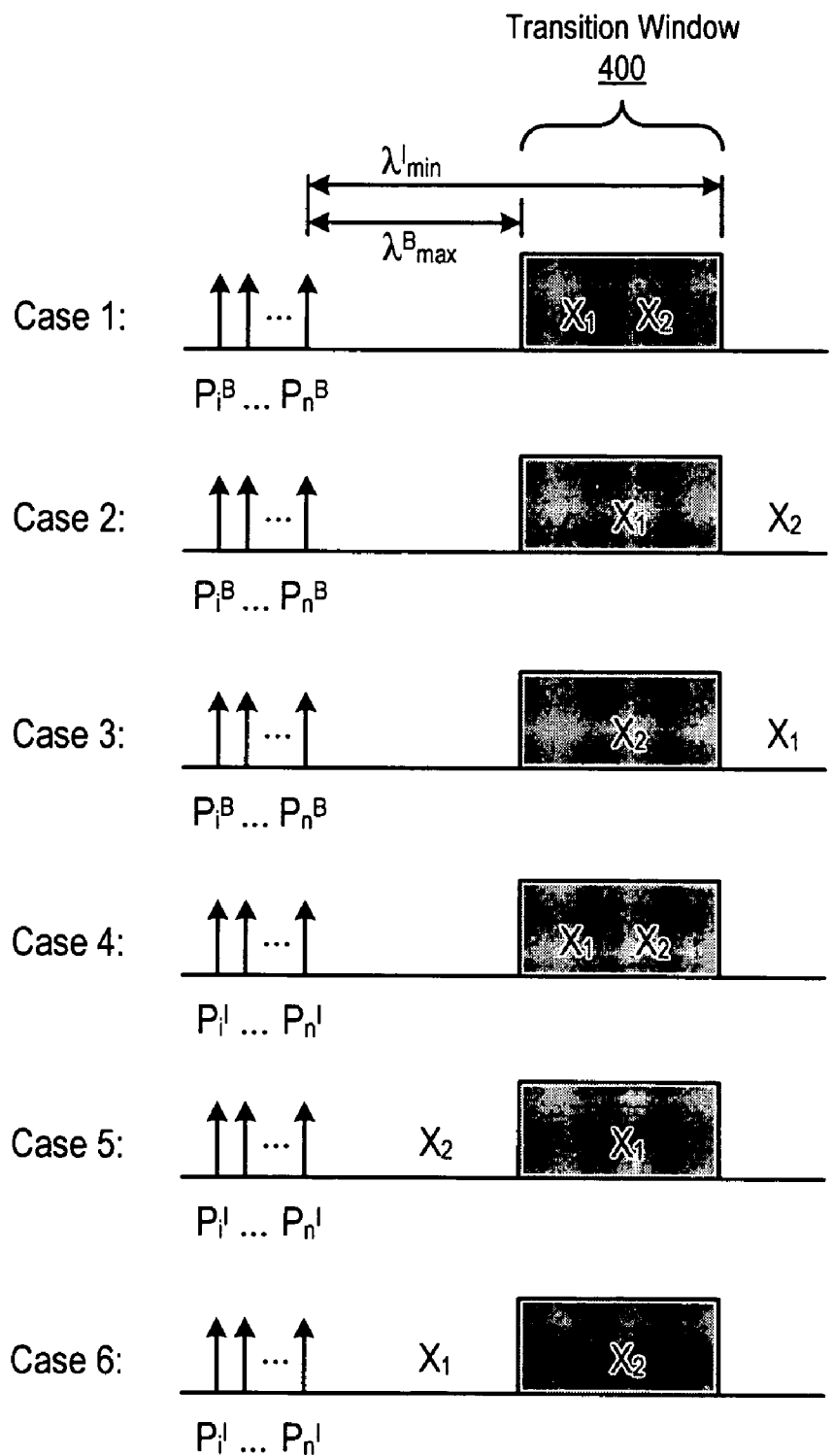
FIG. 4 sets forth exemplary timing diagrams of network traffic for analysis using the exemplary improved Markov Modulated Poisson Process Model with two barrier states illustrated in FIG. 3.

In case 2 of FIG. 4, the inter-arrival time of packet $X_1$ is greater than $\lambda^B_{max}$ and less than $\lambda^I_{min}$. After the arrival of packet $X_1$, the current state is set to the bursty barrier state and the current fence value is set to '1.' The inter-arrival time of packet $X_2$ is greater than $\lambda^B_{max}$ and greater than $\lambda^I_{min}$. After the arrival of packet $X_2$, the current state is set to the idle state and the current fence value is set to '0' because the probability of a premature transition occurring from the bursty state to the idle state is extremely low when the inter-arrival times of two consecutive packets are greater than $\lambda^B_{max}$.

In case 3 of FIG. 4, the inter-arrival time of packet $X_1$ is greater than $\lambda^B_{max}$ and greater than $\lambda^I_{min}$. After the arrival of packet $X_1$, the current state is set to the bursty barrier state and the current fence value is set to '1.' The inter-arrival time of packet $X_2$ is greater than $\lambda^B_{max}$ and less than $\lambda^I_{min}$. After the arrival of packet $X_2$, the current state is set to the idle state and the current fence value is set to '0' because the probability of a premature transition occurring from the bursty state to the idle state is extremely low when the inter-arrival times of two consecutive packets are greater than $\lambda^B_{max}$.

The timing diagrams for cases 4-6 depict the arrival of packets with inter-arrival times that result in a transition from the idle state to the bursty state through the idle barrier state. Because the initial state in each case 4-6 is the idle state, each packet $P_i \ldots P_n$ includes a superscripted 'I.' In case 4 of FIG. 4, the inter-arrival time of packet $X_1$ is less than $\lambda^I_{min}$ and greater than $\lambda^B_{max}$. After the arrival of packet $X_1$, the current state is set to the idle barrier state and the current fence value is set to '1.' The inter-arrival time of packet $X_2$ is also less than $\lambda^I_{min}$ and greater than $\lambda^B_{max}$. After the arrival of packet $X_2$, the current state is set to the bursty state and the current fence value is set to '0' because the probability of a premature transition occurring from the idle state to the bursty state is extremely low when the inter-arrival times of two consecutive packets are less than $\lambda^I_{min}$. Such a probability is determined by the value for $\lambda^I_{min}$.

In case 5 of FIG. 4, the inter-arrival time of packet $X_1$ is less than $\lambda^I_{min}$ and greater than $\lambda^B_{max}$. After the arrival of packet $X_1$, the current state is set to the idle barrier state and the current fence value is set to '1.' The inter-arrival time of packet $X_2$ is less than $\lambda^I_{min}$ and is less than $\lambda^B_{max}$. After the arrival of packet $X_2$, the current state is set to the bursty state and the current fence value is set to '0' because the probability of a premature transition occurring from the idle state to the bursty state is extremely low when the inter-arrival times of two consecutive packets are less than $\lambda^I_{min}$.

In case 6 of FIG. 4, the inter-arrival time of packet $X_1$ is less than $\lambda^I_{min}$ and less than $\lambda^B_{max}$. After the arrival of packet $X_1$, the current state is set to the idle barrier state and the current fence value is set to '1.' The inter-arrival time of packet $X_2$ is less than $\lambda^I_{min}$ and is greater than $\lambda^B_{max}$. After the arrival of packet $X_2$, the current state is set to the bursty state and the current fence value is set to '0' because the probability of a premature transition occurring from the idle state to the bursty state is extremely low when the inter-arrival times of two consecutive packets are less than $\lambda^I_{min}$.

The descriptions above with reference to FIGS. 3 and 4 are concerned with an example of an improved Markov Modulated Poisson Process Model with two barrier states. For further explanation, FIG. 5 sets forth a flow chart illustrating an exemplary method for analyzing network traffic using an improved Markov Modulated Poisson Process Model with two barrier states according to embodiments of the present invention.

Figure 5:
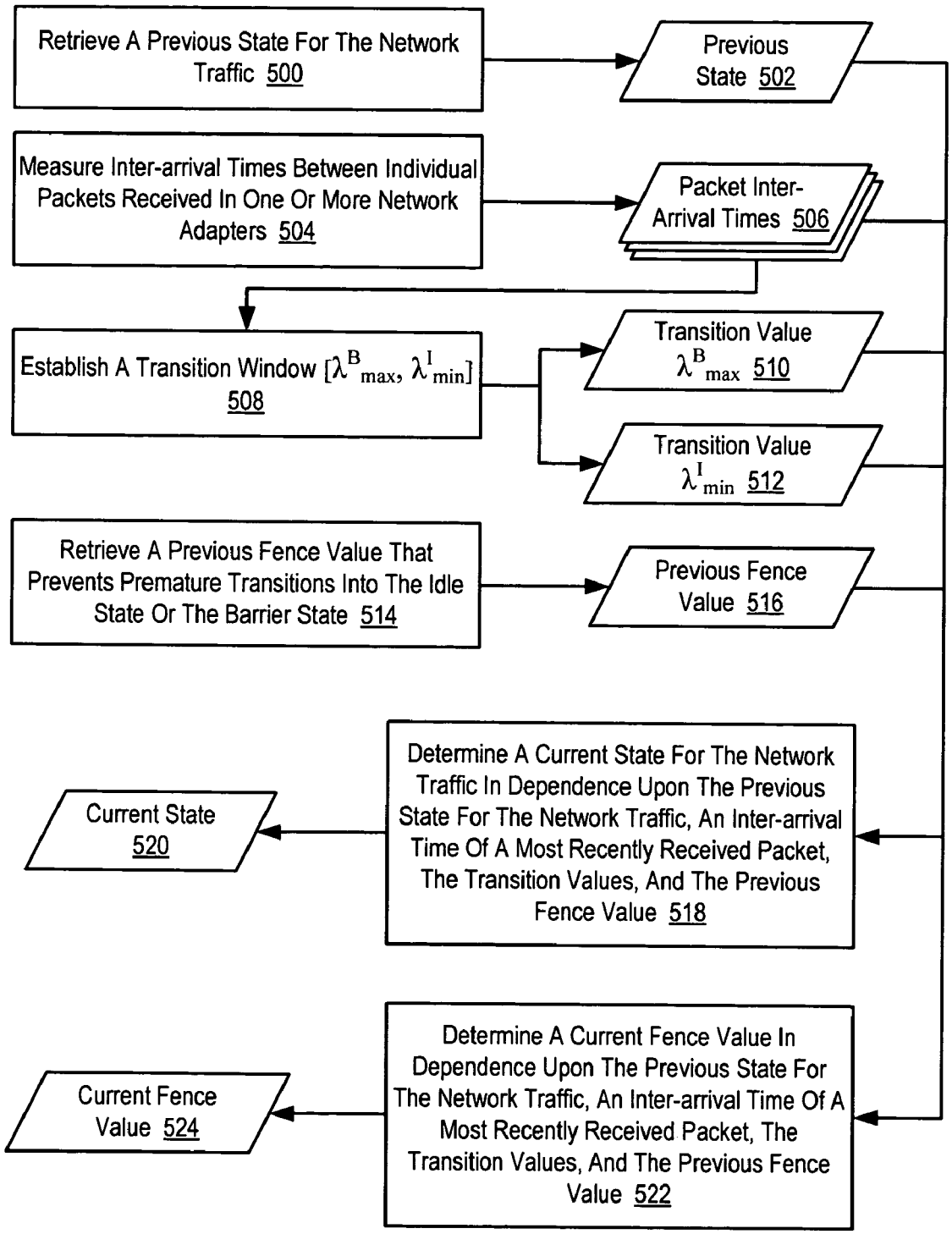
FIG. 5 sets forth a flow chart illustrating an exemplary method for analyzing network traffic using an improved Markov Modulated Poisson Process Model with two barrier states according to embodiments of the present invention.

The method of FIG. 5 includes retrieving (500) a previous state (502) for the network traffic. The previous state (502) is the last state determined when analyzing network traffic using an improved Markov Modulated Poisson Process Model with two barrier states according to embodiments of the present invention. Initially, when analyzing network traffic using an improved Markov Modulated Poisson Process Model with two barrier states according to embodiments of the present invention operates for the first time and no last state exists, the previous state (502) may be set to any state defined by the improved model. Retrieving (500) a previous state (502) for the network traffic according to the method of FIG. 5 may be carried out by retrieving a state identifier from a data structure in computer memory that represents the previous state (502).

The method of FIG. 5 also includes measuring (504) inter-arrival times (506) between individual packets received in one or more network adapters. Packet inter-arrival times (506) are the time periods between the arrival of consecutive packets in one or more network adapters. Measuring (504) inter-arrival times (506) between individual packets received in one or more network adapters according to the method of FIG. 5 may be carried out by retrieving arrival time stamps for the packets from one or more network adapters. Measuring (504) inter-arrival times (506) between individual packets received in one or more network adapters according to the method of FIG. 5 may further be carried out by repeatedly subtracting an arrival time-stamp for the most recently received packet in the network adapters from an arrival time-stamp for the second most recently received packet in the network adapters. When measuring (504) occurs across more than one network adapter, the clocks for each network adapter that provide the arrival time stamp may be synchronized periodically using a synchronization clock signal.

The method of FIG. 5 includes establishing (508) a transition window $[\lambda^B_{max}, \lambda^I_{min}]$ (510, 512) in dependence upon the measured inter-arrival times (506). The $\lambda^B_{max}$ (510) represents an upper boundary for the inter-arrival times in a bursty state and defines a probability $\rho^B$ that a packet with an inter-arrival time lower than $\lambda^B_{max}$ belongs to the bursty state. The $\lambda^I_{min}$ (512) represents a lower boundary for the inter-arrival times in an idle state and defines a probability $\rho^I$ that a packet with an inter-arrival time higher than $\lambda^I_{min}$ belongs to the idle state. Establishing (508) a transition window $[\lambda^B_{max}, \lambda^I_{min}]$ (510, 512) in dependence upon the measured inter-arrival times according to the method of FIG. 5 may be carried out by tracking changes in the inter-arrival times (506) between individual packets received during the bursty state, and determining the transition value $\lambda^B_{max}$ (510) in dependence upon the tracked changes as described below with reference to FIG. 6A. Establishing (508) a transition window $[\lambda^B_{max}, \lambda^I_{min}]$ (510, 512) in dependence upon the measured inter-arrival times (506) according to the method of FIG. 5 may also be carried out by tracking changes in the inter-arrival times between individual packets received during the idle state, and determining the transition value $\lambda^I_{min}$ (512) in dependence upon the tracked changes as described below with reference to FIG. 6B.

Readers will note that initially when analyzing network traffic using an improved Markov Modulated Poisson Process Model with two barrier states according to embodiments of the present invention operates for the first time, the measured inter-arrival times (506) do not exist for use in establishing (508) a transition window $[\lambda^B_{max}, \lambda^I_{min}]$ (510, 512). In such a startup scenario, establishing (508) a transition window $[\lambda^B_{max}, \lambda^I_{min}]$ (510, 512) may be carried out by setting the transition value $\lambda^B_{max}$ and the transition value $\lambda^I_{min}$ to predefined settings as will occur to those of skill in the art. For example, the transition value $\lambda^B_{max}$ may be set to ten microseconds, and the transition value $\lambda^I_{min}$ may be set to ten milliseconds. Although the initial settings for the transition values may not accurately reflect the network traffic conditions, the establishing (508) a transition window $[\lambda^B_{max}, \lambda^I_{min}]$ (510, 512) in dependence upon the measured inter-arrival times (506) described above effectively corrects the transition values over time to accurately reflect the network traffic.

The method of FIG. 5 also includes retrieving (514) a previous fence value (516) that prevents premature transitions into the idle state or the bursty state. The previous fence value (516) is the last fence value determined when analyzing network traffic using an improved Markov Modulated Poisson Process Model with two barrier states according to embodiments of the present invention. Initially, when analyzing network traffic using an improved Markov Modulated Poisson Process Model with two barrier states according to embodiments of the present invention operates for the first time and no last state exists, the previous fence value (516) may be set to any value within the range defined for the improved model. In the improved model described above with reference to FIG. 3, for example, the range for the fence value was either '0' or '1.' Retrieving (514) a previous fence value (516) according to the method of FIG. 5 may be carried out by retrieving a value from a data structure in computer memory that represents the previous fence value (516).

The method of FIG. 5 includes determining (518) a current state (520) for the network traffic in dependence upon the previous state (502) for the network traffic, an inter-arrival time (506) of a most recently received packet, the transition values (510, 512), and the previous fence value (516). The current state (520) of FIG. 5 represents one of the states defined by the improved model that characterizes the current network traffic. Determining (518) a current state (520) for the network traffic according to the method of FIG. 5 may be carried out according to the twelve cases illustrated in the state diagram of FIG. 3 and described with reference to FIG. 3. Determining (518) a current state (520) for the network traffic according to the method of FIG. 5 may further be carried out by storing a state identifier for the state that characterizes the current network traffic in a data structure in computer memory that represent the current state (520).

The method of FIG. 5 also includes determining (522) a current fence value (524) in dependence upon the previous state (502) for the network traffic, an inter-arrival time (506) of a most recently received packet, the transition values (510, 512), and the previous fence value (516). The current fence value (524) is the value of a counter that prevents premature transitions into the idle state or the bursty state according to current network traffic. Determining (522) a current fence value (524) according to the method of FIG. 5 may be carried out according to the twelve cases illustrated in the state diagram of FIG. 3 and described with reference to FIG. 3. Determining (522) a current fence value (524) according to the method of FIG. 5 may further be carried out by storing the current fence value in a data structure in computer memory that represents the value of the fence.

As mentioned above, establishing a transition window $[\lambda^B_{max}, \lambda^I_{min}]$ in dependence upon the measured inter-arrival times may be carried out by tracking changes in the inter-arrival times between individual packets received during the bursty state, and determining the transition value $\lambda^B_{max}$ in dependence upon the tracked changes. For further explanation, therefore, FIG. 6A sets forth a flow chart illustrating an exemplary method for establishing (508) a transition window $[\lambda^B_{max}, \lambda^I_{min}]$ in dependence upon the measured inter-arrival times (506) useful in analyzing network traffic using an improved Markov Modulated Poisson Process Model with two barrier states according to embodiments of the present invention that includes tracking (600) changes (602) in the inter-arrival times (506) between individual packets received during the bursty state and determining (604) the transition value $\lambda^B_{max}$ (510) in dependence upon the tracked changes (602). The tracked changes (602) of FIG. 6A represent the changes in the packet inter-arrival times (506) over time for packets received in one or more network adapters during the bursty state.

Figure 6A:
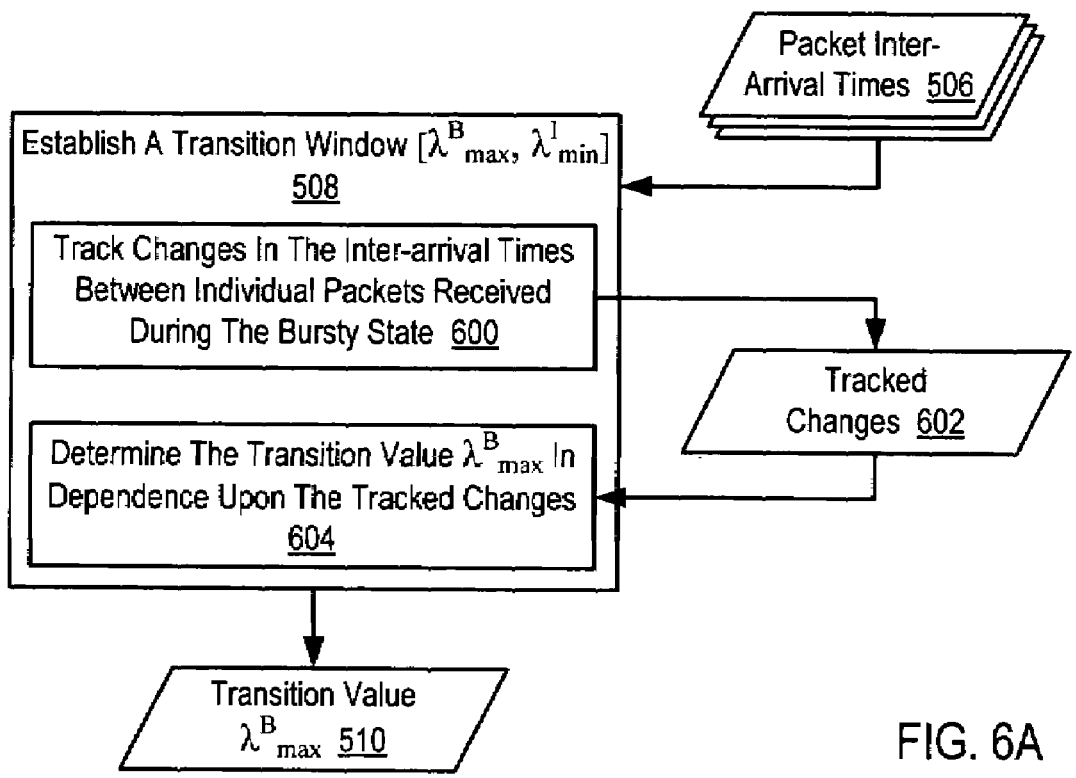
FIG. 6A sets forth a flow chart illustrating an exemplary method for establishing a transition window $[\lambda^B_{max}, \lambda^I_{min}]$ in dependence upon the measured inter-arrival times useful in analyzing network traffic using an improved Markov Modulated Poisson Process Model with two barrier states according to embodiments of the present invention.

In the method of FIG. 6A, tracking (600) changes (602) in the inter-arrival times (506) between individual packets received during the bursty state may be carried out by maintaining a moving average $\lambda^B_{mean}$ of the inter-arrival times between individual packets received during the bursty state. Although tracking (600) changes (602) in the inter-arrival times between individual packets received during the bursty state may be carried out using moving averages, tracking (600) changes (602) according to the method of FIG. 6A may also be carried out in other ways as will occur to those of skill in the art.

In the method of FIG. 6A, determining (604) the transition value $\lambda^B_{max}$ (510) in dependence upon the tracked changes (602) may be carried out by calculating the transition value $\lambda^B_{max}$ (510) as five standard deviations greater than the moving average $\lambda^B_{mean}$. While in the bursty state using such a value for $\lambda^B_{max}$, the relative probability that a packet arrival belongs to the bursty state when the inter-arrival time is greater than $\lambda^B_{max}$ is much smaller than one percent. Although determining (604) the transition value $\lambda^B_{max}$ (510) in dependence upon the tracked changes (602) may be carried out using standard deviation calculations, determining (604) the transition value $\lambda^B_{max}$ (510) in dependence upon the tracked changes (602) according to the method of FIG. 6A may also be carried out in other ways as will occur to those of skill in the art.

As mentioned above establishing a transition window $[\lambda^B_{max}, \lambda^I_{min}]$ in dependence upon the measured inter-arrival times may also be carried out by tracking changes in the inter-arrival times between individual packets received during the idle state, and determining the transition value $\lambda^I_{min}$ in dependence upon the tracked changes. For further explanation, therefore, FIG. 6B sets forth a flow chart illustrating a further exemplary method for establishing (508) a transition window $[\lambda^B_{max}, \lambda^I_{min}]$ in dependence upon the measured inter-arrival times (506) useful in analyzing network traffic using an improved Markov Modulated Poisson Process Model with two barrier states according to embodiments of the present invention that includes tracking (610) changes (612) in the inter-arrival times (506) between individual packets received during the idle state and determining (614) the transition value $\lambda^I_{min}$ (512) in dependence upon the tracked changes (612). The tracked changes (612) of FIG. 6B represent the changes in the packet inter-arrival times (506) over time for packets received in one or more network adapters during the idle state.

Figure 6B:
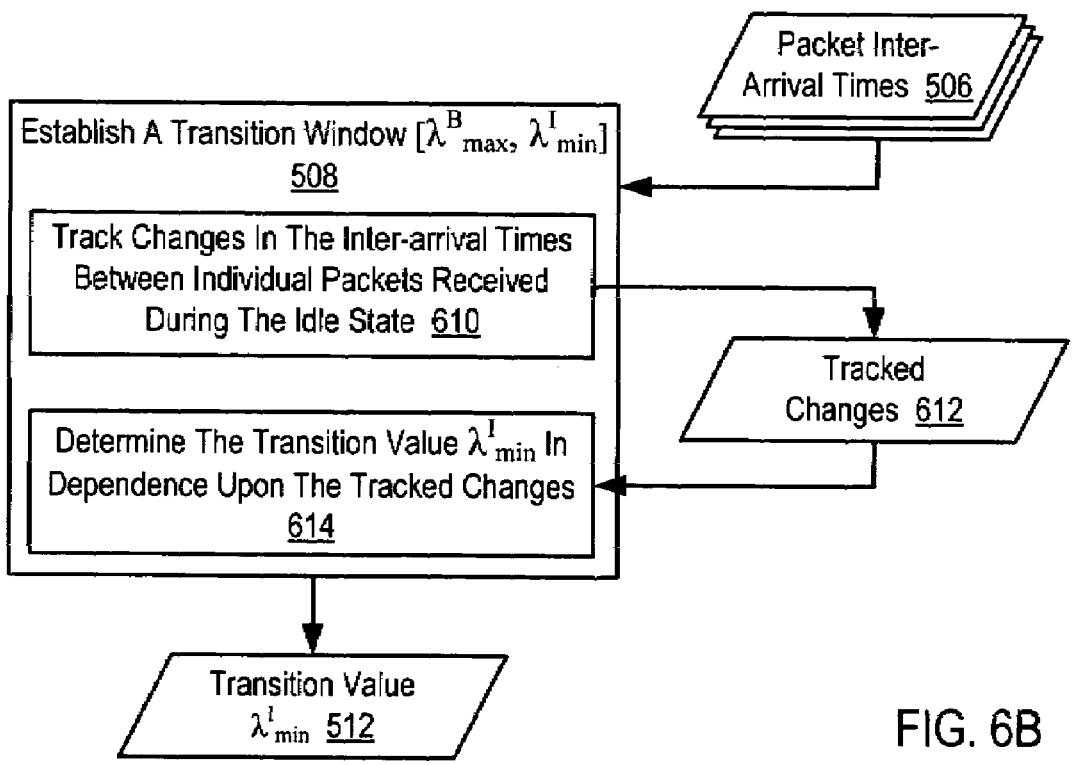
FIG. 6B sets forth a flow chart illustrating a further exemplary method for establishing a transition window $[\lambda^B_{max}, \lambda^I_{min}]$ in dependence upon the measured inter-arrival times useful in analyzing network traffic using an improved Markov Modulated Poisson Process Model with two barrier states according to embodiments of the present invention.

In the method of FIG. 6B, tracking (610) changes (612) in the inter-arrival times between individual packets received during the idle state may be carried out by maintaining an moving average $\lambda^I_{mean}$ of the inter-arrival times between individual packets received during the idle state. Although tracking (610) changes (612) in the inter-arrival times between individual packets received during the idle state may be carried out using moving averages, tracking (610) changes (612) according to the method of FIG. 6B may be carried out in other ways as will occur to those of skill in the art.

In the method of FIG. 6B, determining (614) the transition value $\lambda^I_{min}$ (512) in dependence upon the tracked changes (612) may be carried out by calculating the transition value $\lambda^I_{min}$ (512) as two standard deviations lower than the moving average $\lambda^I_{mean}$. While in the idle state using such a value for $\lambda^I_{min}$, the relative probability that a packet arrival belongs to the idle state when the inter-arrival time is less than $\lambda^I_{min}$ is much smaller than one percent. Although determining (614) the transition value $\lambda^I_{min}$ (512) in dependence upon the tracked changes (612) may be carried out using standard deviation calculations, determining (614) the transition value $\lambda^I_{min}$ (512) in dependence upon the tracked changes (612) according to the method of FIG. 6B may also be carried out in other ways as will occur to those of skill in the art.

Exemplary embodiments of the present invention are described largely in the context of a fully functional computer system for analyzing network traffic using an improved Markov Modulated Poisson Process Model with two barrier states. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for analyzing network traffic using an improved Markov Modulated Poisson Process ('MMPP') Model with two barrier states, the method comprising:
   retrieving a previous state for the network traffic;
   measuring inter-arrival times between individual packets received in one or more network adapters;
   establishing a transition window $[\lambda^B_{max}, \lambda^I_{min}]$ in dependence upon the measured inter-arrival times, the transition window having a transition value $\lambda^B_{max}$ that represents an upper boundary for the inter-arrival times in a bursty state and a transition value $\lambda^I_{min}$ that represents a lower boundary for the inter-arrival times in an idle state;

retrieving a previous fence value that prevents premature transitions into the idle state or the bursty state; and determining a current state for the network traffic in dependence upon the previous state for the network traffic, an inter-arrival time of a most recently received packet, the transition values, and the previous fence value;

wherein the barrier states comprise a bursty barrier state and an idle barrier state, the bursty barrier state representing a potential transition from the bursty state to the idle state, the idle barrier state representing a potential transition from the idle state to the bursty state.

2. The method of claim 1 wherein analyzing network traffic using an improved MMPP Model with two barrier states is carried out in real-time.

3. The method of claim 1 wherein the transition value $\lambda^B_{max}$ is smaller than the transition value $\lambda^I_{min}$.

4. The method of claim 1 further comprising determining a current fence value in dependence upon the previous state for the network traffic, an inter-arrival time of a most recently received packet, the transition values, and the previous fence value.

5. The method of claim 1 wherein establishing a transition window $[\lambda^B_{max}, \lambda^I_{min}]$ in dependence upon the measured inter-arrival times further comprises:

tracking changes in the inter-arrival times between individual packets received during the bursty state; and determining the transition value $\lambda^B_{max}$ in dependence upon the tracked changes.

6. The method of claim 1 wherein establishing a transition window $[\lambda^B_{max}, \lambda^I_{min}]$ in dependence upon the measured inter-arrival times further comprises:

tracking changes in the inter-arrival times between individual packets received during the idle state; and determining the transition value $\lambda^I_{min}$ in dependence upon the tracked changes.

7. An apparatus for analyzing network traffic using an improved Markov Modulated Poisson Process ('MMPP') Model with two barrier states, the apparatus comprising a computer processor, a computer memory operatively coupled to the computer processor, the computer memory having disposed within it computer program instructions capable of:

retrieving a previous state for the network traffic;

measuring inter-arrival times between individual packets received in one or more network adapters;

establishing a transition window $[\lambda^B_{max}, \lambda^I_{min}]$ in dependence upon the measured inter-arrival times, the transition window having a transition value $\lambda^B_{max}$ that represents an upper boundary for the inter-arrival times in a bursty state and a transition value $\lambda^I_{min}$ that represents a lower boundary for the inter-arrival times in an idle state;

retrieving a previous fence value that prevents premature transitions into the idle state or the bursty state; and determining a current state for the network traffic in dependence upon the previous state for the network traffic, an inter-arrival time of a most recently received packet, the transition values, and the previous fence value;

wherein the barrier states comprise a bursty barrier state and an idle barrier state, the bursty barrier state representing a potential transition from the bursty state to the idle state, the idle barrier state representing a potential transition from the idle slate to the bursty state.

8. The apparatus of claim 7 further comprising computer program instructions capable of determining a current fence value in dependence upon the previous state for the network traffic, an inter-arrival time of a most recently received packet, the transition values, and the previous fence value.

9. The apparatus of claim 7 wherein establishing a transition window $[\lambda^B_{max}, \lambda^I_{min}]$ in dependence upon the measured inter-arrival times further comprises:

tracking changes in the inter-arrival times between individual packets received during the bursty state; and determining the transition value $\lambda^B_{max}$ in dependence upon the tracked changes.

10. The apparatus of claim 7 wherein establishing a transition window $[\lambda^B_{max}, \lambda^I_{min}]$ in dependence upon the measured inter-arrival times further comprises:

tracking changes in the inter-arrival times between individual packets received during the idle state; and determining the transition value $\lambda^I_{min}$ in dependence upon the tracked changes.

11. A computer program product for analyzing network traffic using an improved Markov Modulated Poisson Process ('MMPP') Model with two barrier states, the computer program product disposed upon a recordable medium for machine-readable information, the computer program product comprising computer program instructions capable of:

retrieving a previous state for the network traffic;

measuring inter-arrival times between individual packets received in one or more network adapters;

establishing a transition window $[\lambda^B_{max}, \lambda^I_{min}]$ in dependence upon the measured inter-arrival times, the transition window having a transition value $\lambda^B_{max}$ that represents an upper boundary for the inter-arrival times in a bursty state and a transition value $\lambda^I_{min}$ that represents a lower boundary for the inter-arrival times in an idle state;

retrieving a previous fence value that prevents premature transitions into the idle state or the bursty state; and determining a current state for the network traffic in dependence upon the previous state for the network traffic, an inter-arrival time of a most recently received packet, the transition values, and the previous fence value;

wherein the barrier states comprise a bursty barrier state and an idle barrier state, the bursty barrier state representing a potential transition from the bursty state to the idle state, the idle barrier state representing a potential transition from the idle state to the bursty state.

12. The computer program product of claim 11 wherein analyzing network traffic using an improved MMPP Model with two barrier states is carried out in real-time.

13. The computer program product of claim 11 further comprising computer program instructions capable of determining a current fence value in dependence upon the previous state for the network traffic, an inter-arrival time of a most recently received packet, the transition values, and the previous fence value.

14. The computer program product of claim 11 wherein establishing a transition window $[\lambda^B_{max}, \lambda^I_{min}]$ in dependence upon the measured inter-arrival times further comprises:

tracking changes in the inter-arrival times between individual packets received during the bursty state; and determining the transition value $\lambda^B_{max}$ in dependence upon the tracked changes.

15. The computer program product of claim 11 wherein establishing a transition window $[\lambda^B_{max}, \lambda^I_{min}]$ in dependence upon the measured inter-arrival times further comprises:

tracking changes in the inter-arrival times between individual packets received during the idle state; and determining the transition value $\lambda^I_{min}$ in dependence upon the tracked changes.

* * * * *